Figures 1, 2:
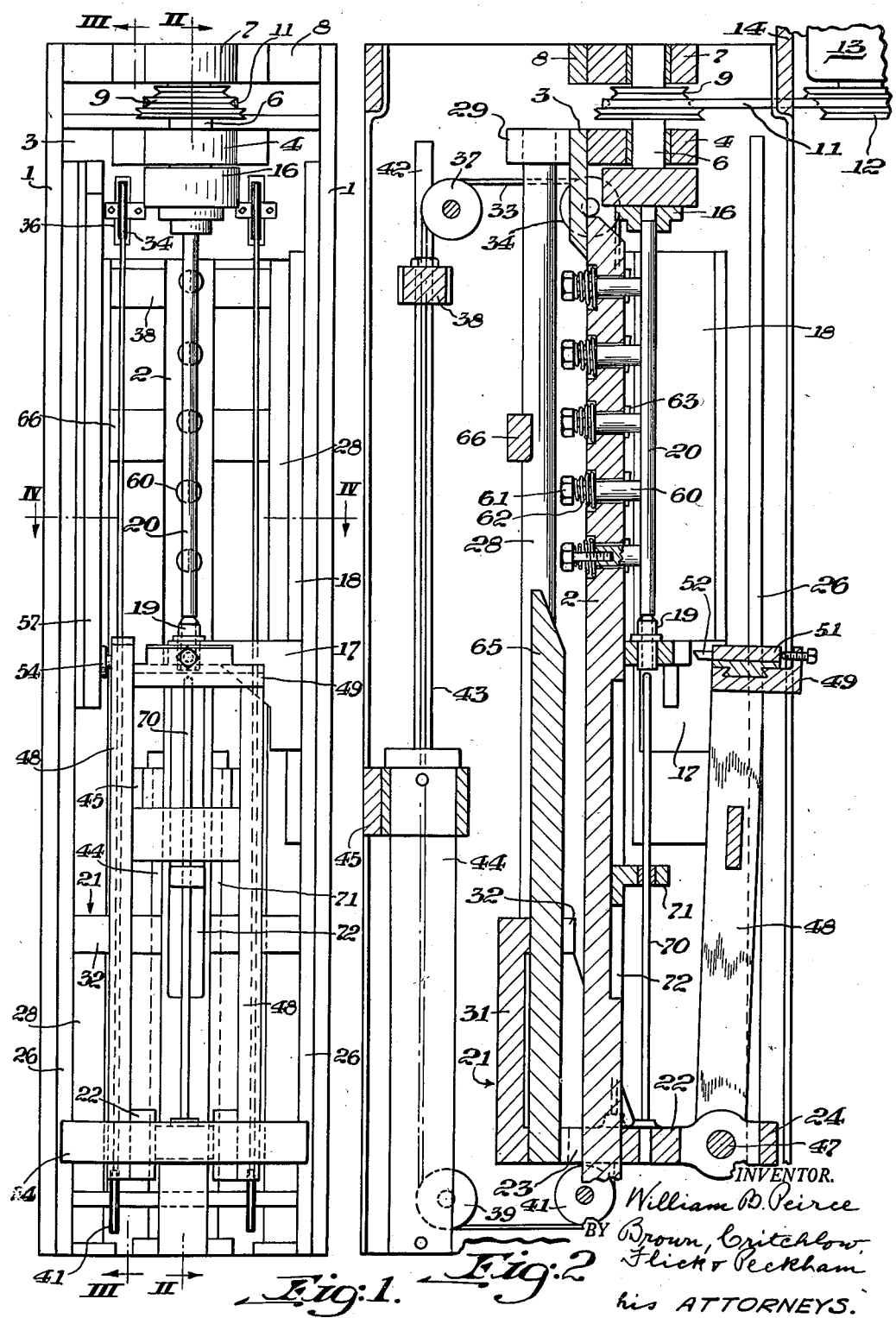

Feb. 26, 1952     W. B. PEIRCE     2,587,519
MACHINE TOOL
Filed Feb. 9, 1949     2 SHEETS—SHEET 1

INVENTOR.
William B. Peirce
BY Brown, Critchlow,
Flick & Peckham
his ATTORNEYS.

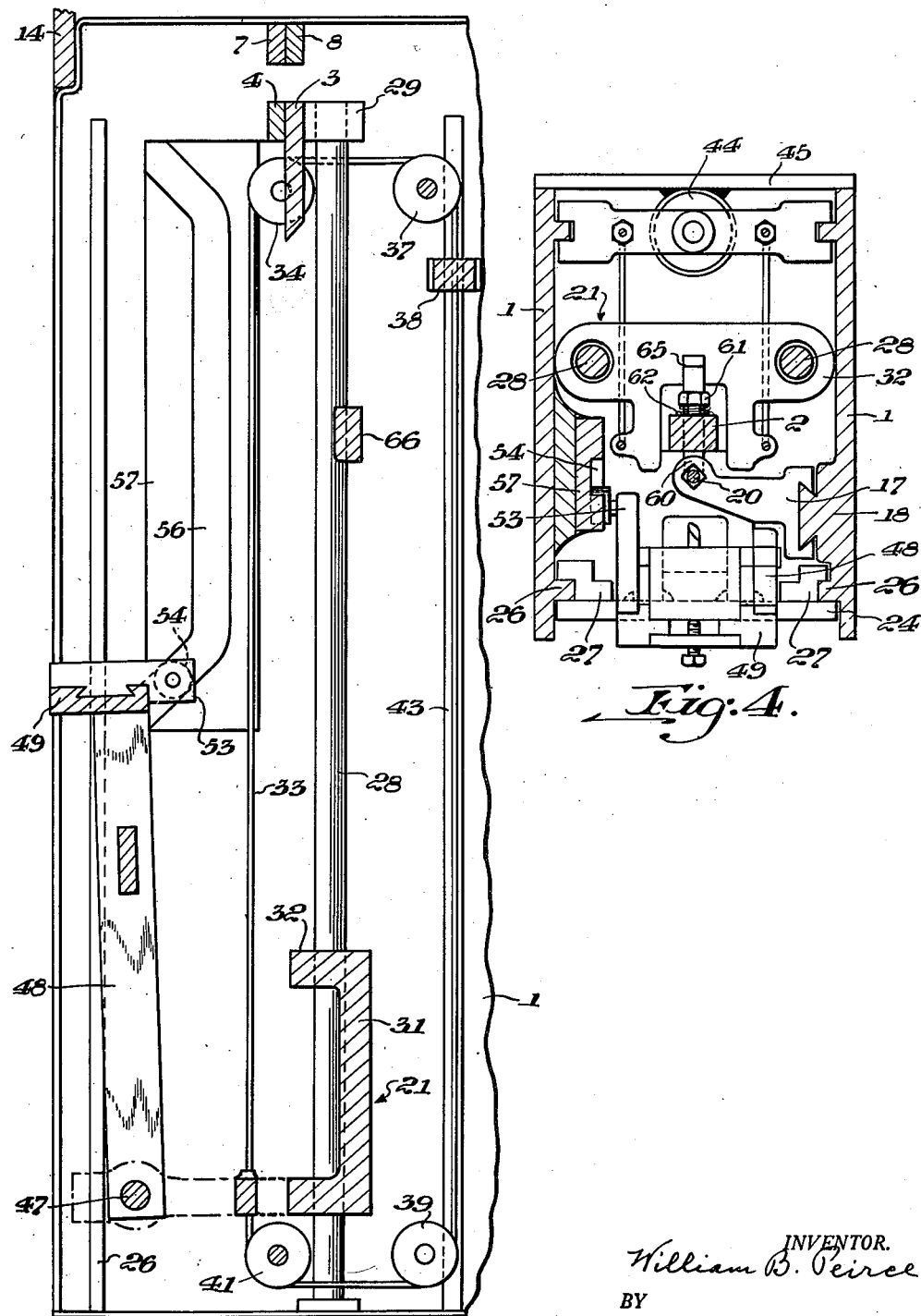

Patented Feb. 26, 1952

2,587,519

UNITED STATES PATENT OFFICE 2,587,519

MACHINE TOOL

William B. Peirce, Pittsburgh, Pa.

Application February 9, 1949, Serial No. 75,326

8 Claims. (Cl. 29—27)

1

This invention relates to machine tools, and more particularly to such a machine for drilling and turning a workpiece.

It is among the objects of this invention to provide a machine tool in which a turning tool is swung into engagement with a rotating workpiece around an axis extending transversely of the axis of rotation of the workpiece, in which the workpiece is supported by progressively actuated steadyrests, and in which a workpiece can be drilled axially at the same time that the outside of it is turned.

In accordance with this invention, a workpiece is supported by a driven headstock and by a tailstock preferably mounted below the headstock. A carriage is spaced from the outer or lower end of the tailstock, toward which it can be advanced by fluid pressure, a screw or other suitable means. An arm has its outer or lower end connected to the carriage on an axis crosswise of the path of movement of the carriage. The inner or upper end of the arm is located at one side of the tailstock and carries a turning tool. Means is provided for swinging the upper end of the arm toward the tailstock when the carriage is elevated, whereby to move the tool into engagement with the outside of the rotating workpiece. This preferably is done by means of a roller carried by the arm and traveling along a cam track. As the tool advances along the workpiece, the turned portion thereof is supported by one or more normally retracted steadyrests which can be actuated by a cam bar carried by the carriage. The carriage also may support a drill which can be raised through a passage through the tailstock and then advanced through the center of the rotating workpiece. The turning tool is ahead of the upper end of the drill so that the portion of the workpiece being turned is always solid. Considerable time is saved by turning the outside of the workpiece at the same time that its inside is being drilled out.

The preferred embodiment of the invention is illustrated in the accompanying drawings, in which Fig. 1 is a front view of my machine tool; Figs. 2 and 3 are vertical sections taken on the lines II—II and III—III, respectively, of Fig. 1; and Fig. 4 is a horizontal section taken on the line IV—IV of Fig. 1.

Referring to the drawings, the frame of the machine may be formed in any suitable manner, such as from side walls 1 connected by suitable cross members. Disposed midway between the side walls is a rectangular vertical post 2 which

2 is connected at its upper end to a heavy plate 3 extending across the frame from one wall to the other. Mounted on the front of this plate is a bearing 4 in which the lower end of a shaft 6 is journaled. The upper end of the shaft is journaled in a similar bearing 7 connected to another cross member 8. Between the two bearings a set of sheaves 9 is rigidly mounted on the shaft. Any one of these sheaves can be driven by a belt 11 from one of a set of sheaves 12 driven by an electric motor 13 mounted on the front cross member 14 of the frame. The lower end of shaft 6 supports a headstock 16 of any suitable construction, the details of which are not shown. Below this headstock there is a tailstock which includes a bracket 17 that is adjustable vertically on a guide plate 18 attached to one side wall of the frame. The inner end of the bracket is provided in line with the headstock with a vertical opening in which a hollow rotatable spindle 19 is journaled for engaging and supporting the lower end of a workpiece 20 held in the headstock. The workpiece may be a rod which is to be formed into a shot gun or rifle barrel.

Near the bottom of the frame, below the tailstock, there is a vertically movable carriage 21. This carriage has a horizontal base 22 provided with a vertical opening 23 through which the center post 2 extends. The front of the carriage base is bifurcated and has extending across it a horizontal bar 24 that overlaps vertical guide bars 26 attached to the side walls of the frame. As shown in Fig. 4, the end portions of the horizontal bar carry shoes 27 which slidably engage the other two exposed sides of the guide bars. The rear of the carriage base has laterally spaced openings through it, through which cylindrical guide posts 28 extend. The upper ends of these posts are secured by brackets 29 to the back of the cross plate 3. The carriage also has an upwardly extending rear wall 31 provided at its upper end with a forwardly projecting portion 32 in which there are openings through which the guide posts also extend.

The carriage is raised and lowered by a pair of flexible tension members, such as chains or cables 33 which have their ends connected to the top and bottom of the carriage base. The cables extend upward from the carriage and over sheaves 34 mounted in slots 36 in cross plate 3. From these sheaves the cables extend back and down over another pair of sheaves 37 mounted in the frame, and then down through a crosshead 38 in which the cables are rigidly mounted. From the crosshead the cables extend down around a third pair of sheaves 39 and then forward and up around a fourth pair 41 to the bottom of the carriage. The ends of crosshead 38 are provided with vertical slots which fit around vertical guide bars 42 attached to the inside of the side walls of the frame. The crosshead is moved up and down by a piston rod 43 which has on its lower end a piston (not shown) disposed in a vertical fluid pressure cylinder 44 connected to a cross member 45 extending across the back of the machine. Fluid pressure admitted to the bottom of the cylinder will force the piston and crosshead upward, while pressure admitted to the top of the cylinder will move them down again, thereby reciprocating the carriage 21 vertically. The stroke of the piston may be controlled manually or by limit switches (not shown) that will cause the direction of its movement to be reversed as soon as it reaches either end of its stroke.

Extending through the bifurcated front portion of the carriage base is a horizontal shaft 47, on the end portions of which are pivotally mounted the lower ends of a pair of parallel bars 48 that are rigidly connected at their upper ends by a horizontal slotted guide member 49 adjustably supporting a tool rest 51. These bars and guide member form an arm which can be swung toward and away from the tailstock and workpiece. The tool rest supports a tool 52 for turning the outside of the workpiece. When the carriage is in its lowest position, this tool is below the level of the lower end of the workpiece and preferably in front of the tailstock as shown in Fig. 2.

One bar 48 of the tool arm has a rearwardly projecting extension 53 at its upper end carrying a cam follower roller 54 that travels in a cam track groove 56 formed in a cam plate 57 mounted on the adjacent side wall of the frame. The cam track is so shaped as to swing the upper end of the tool arm in toward the workpiece when the carriage moves upward. For this purpose, as shown in Fig. 3, the lower portion of the cam groove is inclined upward and rearward toward a vertical portion that terminates at its upper end in a forwardly inclined portion which moves the tool away from the workpiece. When the shape of the turned workpiece is to be cylindrical, the vertical portion of the cam groove is parallel to the adjacent carriage guide bar 26. If the turned workpiece is to be tapered like a gun barrel, the vertical portion of the cam groove will be inclined away from that bar to give the proper degree of taper. Due to the fact that the shaft 47 extends crosswise of the axis of the workpiece, instead of parallel to it, the tool 52 will not advance part way around a tapered workpiece as the tool moves toward the smaller end of the work, but will only move closer to the axis of the work. This prevents the tool from chattering and produces a smoother and better cut.

Behind the workpiece the center post 2 is provided with a plurality of vertically spaced horizontal openings, in most or all of which adjustable steadyrests are mounted. Each steadyrest has a non-rotatable body 60 slidably mounted in one of the openings and projecting from its front end. The front end of the body is shaped to receive and steady the workpiece, such as by being provided with a rearwardly tapered recess or V-notch for straddling the workpiece. Screwed into the rear end of the body is a screw 61, between whose head and the center post a coil spring 62 is compressed. This spring urges the steadyrest rearwardly in the post, but its movement is limited by a vertical pin 63 extending through the projecting front portion of the steadyrest. The screw can be turned to cause it to project different distances from the rear face of the post so that the front end of the steadyrest can be projected different distances than the front of the post.

To push the steadyrests forward into engagement with the workpiece, a vertical cam bar 65 is rigidly mounted in the carriage, above which it extends. A cross bar 66 may be mounted between guide posts 28 behind the steadyrests for backing up the cam bar in order to make it more rigid. The steadyrests can be set to a master workpiece so that each will project the correct distance from the center post when pushed ahead by the cam bar. The positions of the steadyrests are such that they are moved successively into engagement with the workpiece right after the turning tool rises past the portions of the workpiece that they are to engage.

Another feature of this invention is that the workpiece can be drilled axially at the same time that its outside is being turned. Accordingly, a hollow vertical drill 70 has its lower end rigidly mounted in the carriage in axial alignment with the workpiece. The central portion of the drill is slidable through a bracket 71 that is movable lengthwise of the center post in a vertical slot 72. The upper end of the drill is located at a level slightly below the level of the turning tool so that the latter always will operate on a solid, undrilled portion of the workpiece. The drill is moved upward by the rising carriage through the hollow spindle of the tailstock and then up through the center of the rotating workpiece. Although it is not necessary that the machine be disposed vertically as shown, vertical position is preferred because it facilitates ejection of the drilling chips which may still further be helped by high-pressure oil introduced through the hollow drill in well known manner. The entire machine may be set in a pan (not shown) which forms an oil reservoir and a chip receiver.

By turning the outside of the workpiece at the same time that its inside is being drilled, the time ordinarily taken to make one rough cut is saved. Furthermore, as it takes a certain time to drill the workpiece anyway, the outside cut need be and can be made no faster than the drill advances. This results in a better job than heretofore when the turning tool was advanced rapidly along the outside of a workpiece in order to save time. This machine also eliminates the necessity for turning a spot ring on a workpiece in order to control its wall thickness.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A machine tool comprising a driven headstock and a tailstock for supporting a workpiece, a carriage spaced from the outer end of the tailstock, means for advancing the carriage toward the tailstock, an arm having its outer end pivoted to the carriage on an axis crosswise of the path of movement of the carriage, the inner end of the arm being disposed in front of the tailstock, a turning tool carried by said inner end of the arm, means for swinging the inner end of the arm toward the tailstock when the carriage is advanced to move said tool into engagement with the rotating workpiece, a movable steadyrest normally spaced laterally from the workpiece, and means for moving the steadyrest into engagement with a predetermined portion of the workpiece after said tool has turned that portion.

2. A machine tool comprising a driven headstock and a tailstock for supporting a workpiece, a carriage spaced from the outer end of the tailstock, means for advancing the carriage toward the tailstock, an arm having its outer end pivoted to the carriage on an axis crosswise of the path of movement of the carriage, the inner end of the arm being disposed in front of the tailstock, a turning tool carried by said inner end of the arm, means for swinging the inner end of the arm toward the tailstock when the carriage is advanced to move said tool into engagement with the rotating workpiece, a movable steadyrest normally spaced laterally from the workpiece, and means advanced by the advancing carriage for moving the steadyrest into engagement with a predetermined portion of the workpiece after that portion has been turned by said tool.

3. A machine tool comprising a driven headstock and a tailstock for supporting a workpiece, a carriage spaced from the outer end of the tailstock, means for advancing the carriage toward the tailstock, an arm having its outer end pivoted to the carriage on an axis crosswise of the path of movement of the carriage, the inner end of the arm being disposed in front of the tailstock, a turning tool carried by said inner end of the arm, means for swinging the inner end of the arm toward the tailstock when the carriage is advanced to move said tool into engagement with the rotating workpiece, a normally retracted steadyrest between the headstock and tailstock and having its inner end adjacent the workpiece, and a cam bar secured to the carriage and adapted to be moved by it into engagement with the outer end of the steadyrest to advance it into engagement with a predetermined portion of the workpiece after that portion has been turned by said tool.

4. A machine tool comprising a driven headstock and a tailstock for supporting a workpiece, a carriage spaced from the outer end of the tailstock, means for advancing the carriage toward the tailstock, an arm having its outer end pivoted to the carriage on an axis crosswise of the path of movement of the carriage, the inner end of the arm being disposed in front of the tailstock, a turning tool carried by said inner end of the arm, means for swinging the inner end of the arm toward the tailstock when the carriage is advanced to move said tool into engagement with the rotating workpiece, a plurality of laterally spaced steadyrests between the headstock and tailstock having their inner ends located adjacent the workpiece, and means controlled by the advancing carriage for successively moving the steadyrests into engagement with the workpiece, starting with the one closest to the tailstock.

5. A machine tool comprising a driven headstock and a tailstock for supporting a workpiece, a carriage spaced from the outer end of the tailstock, means for advancing the carriage toward the tailstock, an arm having its outer end pivoted to the carriage on an axis crosswise of the path of movement of the carriage, the inner end of the arm being disposed in front of the tailstock, a turning tool carried by said inner end of the arm, means for swinging the inner end of the arm toward the tailstock when the carriage is advanced to move said tool into engagement with the rotating workpiece, a plurality of laterally spaced steadyrests between the headstock and tailstock having their inner ends located adjacent the workpiece, and a cam bar secured to the carriage and adapted to be moved by it into engagement with each of the steadyrests in succession to advance them into engagement with the workpiece as said tool moves along it.

6. A machine tool comprising a driven headstock and a tailstock for supporting a workpiece, a carriage spaced from the outer end of the tailstock, means for advancing the carriage toward the tailstock, an arm having its outer end pivoted to the carriage on an axis crosswise of the path of movement of the carriage, the inner end of the arm being disposed in front of the tailstock, a turning tool carried by said inner end of the arm, means for swinging the inner end of the arm toward the tailstock when the carriage is advanced to move said tool into engagement with the rotating workpiece, a supporting member extending between the headstock and tailstock and provided with a plurality of laterally spaced openings through it perpendicular to the workpiece being turned, a steadyrest slidably mounted in each of said openings and including a spring normally holding the inner end of the steadyrest away from the workpiece, and a cam bar secured to the carriage and adapted to be moved by it into engagement with the outer end of each steadyrest in succession to advance them into engagement with the workpiece as said tool moves along it.

7. A vertical machine tool comprising a driven headstock, a tailstock below the headstock provided with a vertical passage through it, a vertical drill below the tailstock adapted to be moved up through said passage, a carriage supporting the lower end of the drill, means for raising the carriage, a substantially upright arm having its lower end pivoted to the carriage on a horizontal axis, the upper end of the arm being disposed in front of the tailstock, a turning tool carried by said upper end of the arm at a level above the level of the upper end of the drill, and means for swinging the upper end of the arm toward the tailstock when the carriage is raised to move said tool into engagement with a vertical workpiece supported by the headstock and tailstock, whereby the tool will turn the outside of the workpiece while the latter is being drilled below the tool.

8. A vertical machine tool comprising a driven headstock, a tailstock below the headstock provided with a vertical passage through it, a vertical drill below the tailstock adapted to be moved up through said passage, a carriage supporting the lower end of the drill, means for raising the carriage, a substantially upright arm having its lower end pivoted to the carriage on a horizontal axis, the upper end of the arm being disposed in front of the tailstock, a turning tool carried by said upper end of the arm at a level above the level of the upper end of the drill, means for swinging the upper end of the arm toward the tailstock when the carriage is raised to move said tool into engagement with a vertical workpiece supported by the headstock and tailstock, whereby the tool will turn the outside of the workpiece while the latter is being drilled, a plurality of vertically spaced horizontal steadyrests between the headstock and tailstock having their inner ends located adjacent the workpiece, and means elevated by the rising carriage for successively moving the steadyrests into engagement with the workpiece close behind the rising tool.

WILLIAM B. PEIRCE.

REFERENCES CITED

The following references are of record in the file of this patent:

UNITED STATES PATENTS

| Number | Name | Date |
|---|---|---|
| 578,431 | Tucker | Mar. 9, 1897 |
| 971,887 | Hanson | Oct. 4, 1910 |
| 1,374,378 | Johnson | Apr. 12, 1921 |
| 1,539,440 | Smith et al. | May 26, 1925 |
| 2,342,792 | Dare et al. | Feb. 29, 1944 |
| 2,367,414 | Mansfield | Jan. 16, 1945 |
| 2,377,701 | Le Tourneau | June 5, 1945 |